March 4, 1958
J. L. KLEINMAN
2,825,266
ADJUSTABLE EYE-GLASS SETS
Filed April 7, 1950
2 Sheets-Sheet 1
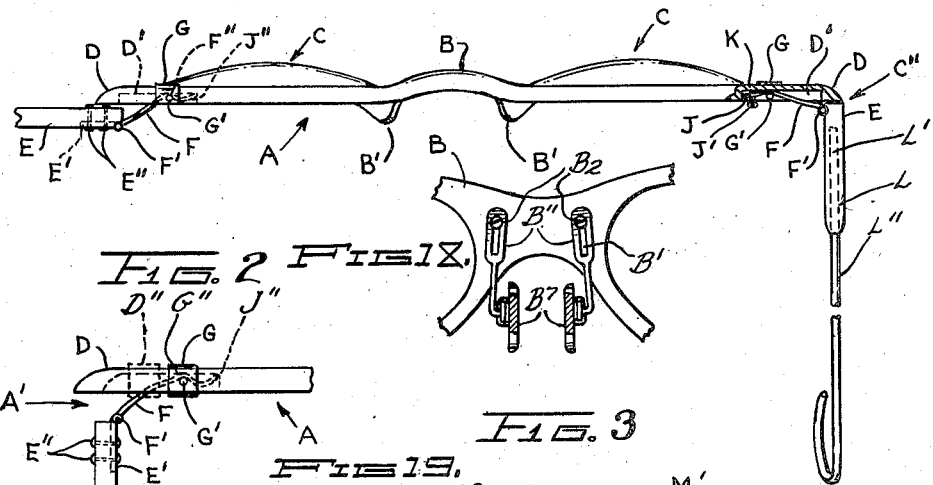
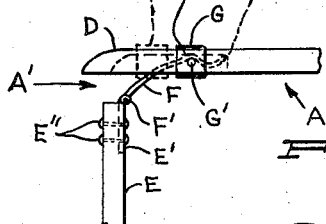
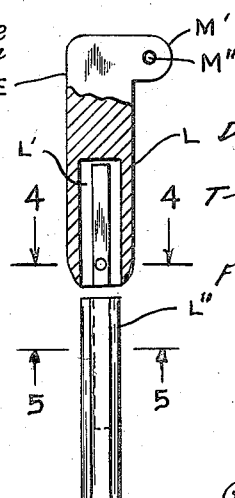
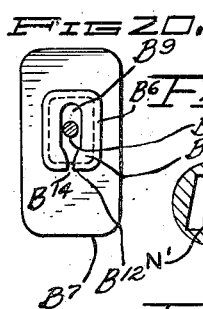
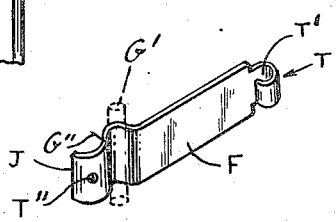
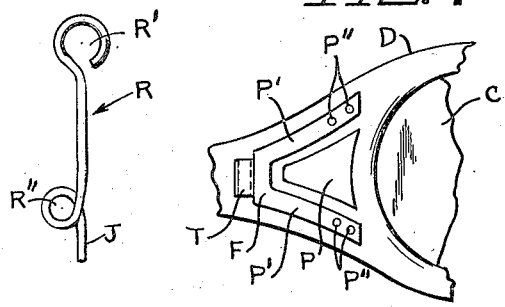
INVENTOR.
Jacob L. Kleinman

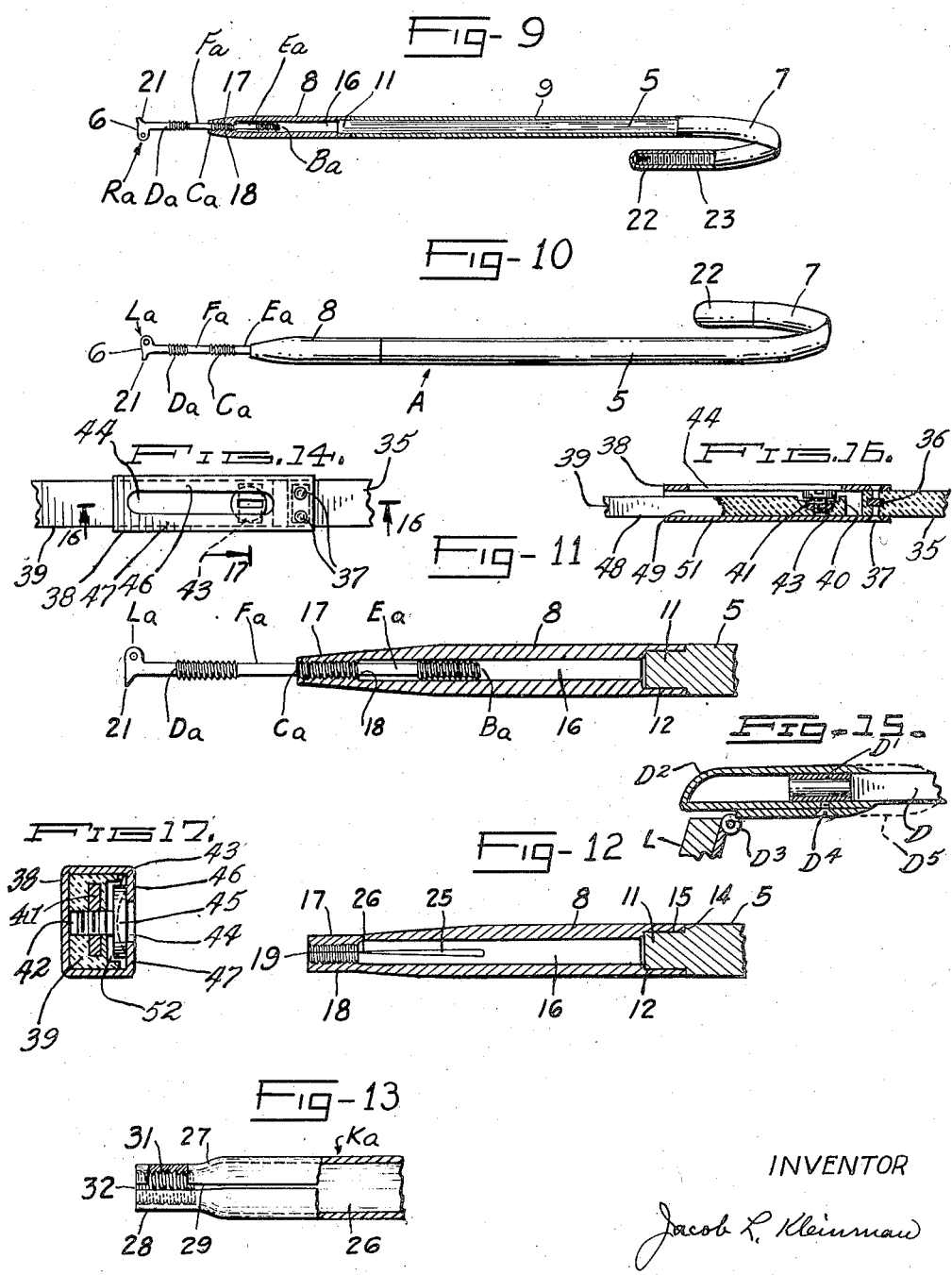

United States Patent Office 2,825,266
Patented Mar. 4, 1958

2,825,266

ADJUSTABLE EYE-GLASS SETS

Jacob L. Kleinman, New York, N. Y.

Application April 7, 1950, Serial No. 154,630

2 Claims. (Cl. 88—41)

This invention relates to adjustable eye-glass sets comprising adjustable eye-glass frames and also adjustable temples, and more particularly to a type of an eye-glass set wherein the frame may be readily adjusted in size to suit the requirements of the individual wearer, and wherein the length of the temples may be readily adjusted into various desirable sizes, and wherein temples of certain designs may be removed and replaced by temples of other designs, thus the wearer may, while using one pair of glasses, match her temples to the style or type of ear-rings or wardrobe she may be wearing, and wherein the hinge-member is flexible to an extent whereby the temple may be swung partly or fully outwardly without straining or flexing the frame portion, and wherein such yieldable action of the springable hinge will also relieve the pulling strain between the ear-hook and the frame, and wherein the pad-carrier can be readily adjusted horizontally and also longitudinally in either direction, and wherein such a pad-carrier may be readily removed and replaced, and wherein tarnished, broken parts, or undesirable portions may be easily removed or replaced by the wearer without the assistance of skilled and costly help.

My novel adjustable eye-glass set structure is capable of being utilized in connection with various styles or types of eye-glasses, field glasses, opera glasses, lenses, eye-glass supporters or the like, but particularly with the type, for example, provided with ear-hook temples.

In accordance with my invention, I produce a frame structure provided with slidable hinge sections to which the temples are hingeably secured, so that by moving these hinge sections in desired direction the temples may be properly positioned with respect to the wearer's face. And because of the flexibility of these hinge sections the tension of pressure against the bridge portion of the wearer's nose will be relieved. And because of such flexible hinge sections the temples may be swung partly or fully slideways without flexing or straining the frame thereby minimizing breakage of the frame and of the glasses as well as of the hinges and of the temples. And in addition thereto, I also provide the bridge portion of the frame with removably mounted pad-carriers which may be easily adjusted in either direction, horizontally or longitudinally, without resorting to forcible bending of the pad arm thereby minmizing breakage of such pad arms. And by providing means for adjusting the length of the temple, such temple can, naturally, be adjusted easily to gauge the desired space between the ear-hook and the frame to suit the requirements of each individual wearer, and in addition thereto, these temples being removably secured to the shank-bars, are naturally exchangeable, in which case the wearer may remove, from time to time, the temples being used and attach to the shank-bars temples of a different design, or color, thereby matching the eye-glass set in a manner to suit the particular occasion; thus popularizing the use of such eye-glass sets and increasing their commercial value.

There is, therefore, thus produced in accordance with my invention, an adjustable eye-glass set comprising a frame, temple structure and pad-carrier, capable of being adjusted into various sizes or positions to meet the requirements of various individual users, thereby being adapted to be worn by various persons, and also capable of being readjusted without the aid of skilled and costly help.

To illustrate the ordinary commercial utility of my novel adjustable eye-glass set in daily life, an eye-glass set constructed in accordance with my invention of whatever style or type it may be made, could be utilized to great advantage; for example, a merchant in order to meet his business requirements must carry in his stock an ample supply of frames, or sets, or temples, of various sizes; each size usually comprises various styles or designs, the size of temples usually range in length from about 5½ inches, running in quarter sizes, up to approximately 7 inches. The same is true with respect to frames which also vary in sizes to suit the requirements of individual persons, for example, persons who have wide or full faces, and persons who have narrow, thin or small faces. Consequently, the merchant must therefore carry a large assortment of frame sets at all times in order to meet his business requirements. This usually represents a big investment which is quite a burden upon the average business man.

Furthermore, in order to stimulate business the manufacturers frequently introduce new styles or designs. The merchant, in order to meet competition, must naturally buy this newly designed merchandise, in such a case his unsold stock of prior designs becomes worthless commercially. In order to cover such losses, and also the large investment, the merchant is compelled to sell his merchandise at a very high price bringing a large profit, so that the average person who usually has to buy reading glasses and also glasses for general use can not afford to have more than one pair of each. This of course presents a very vexing problem in this particular branch of business, as it limits its expansion possibilities.

It is the aim of applicant's present invention to overcome the herein-mentioned objectionable features; and it is believed that this invention will solve the above-mentioned problems and eliminate the difficulties which at present hinders business expansion possibilities, and instead, this invention will open new branches of business in this particular field, it will stimulate the market and boost business to an extent not known heretofore in this particular line. For example, the fact that applicant's frame structure can be adjusted to fit in size to any face, wide or narrow, and the fact that applicant's temples can be adjusted to various sizes in length, will naturally eliminate the necessity for the merchant to carry a large stock of merchandise on hand. His investment will thus be much smaller, his losses, if any, will amount to much less than usual, he will therefore be in a position to sell his merchandise at a lower price thereby increasing sales. In addition to the above, the space and capital thus saved may be utilized for carrying other suitable items which may be found necessary to increase the merchant's business.

The fact that applicant's temples are removably mounted and can therefore be removed and replaced, opens new business opportunities in this field. A woman can easily buy several pairs of temples, of various designs or styles, and as she changes her ear-rings to match her wardrobe she can also change her temples for the same purpose, a matter which she can easily accomplish without resorting to professional or skilled aid.

The fact that applicant's pad-carriers are also removably mounted and can be adjusted with ease longitudinally as well as horizontally without forceful bending of the pad-arms, will minimize breakage to a great extent, It is also believed that applicant's springable hinge will be another desirable feature which will cause the stimulation of business in this particular field. It is quite a known fact that certain persons have a tendency to push up their glasses upon their foreheads; this action places the temples under extra great pulling-strain causing the frames to flex, this flexing causes dislocation of the lenses from the frame, occasionally resulting in breakage of such lenses, or of the frame itself. It also irritates the wearer's forehead. In all, it presents a very annoying and objectionable problem.

However, the use of applicant's flexible hinge section solves the above problem in a complete and satisfactory manner. Because, in such a case, the flexible hingle will, by yielding, take care of such extra strain and release the pulling pressure so that the frames will be free of any strain thereby eliminating dislocation of lenses or the breakage of same or of the frames. It also minimizes pressure against the wearer's forehead.

Furthermore, because of these flexible hinges, the temples can be opened partly or fully sideways without any danger of breaking the temples, lenses, frames or hinges, and when placed in proper position these very same flexible hinges will act as springs to hold such temples in desired position, and yet will not hinder the closing of such temples when the glasses are being placed in a box.

Particularly, applicant's temple structure can be utilized to great advantage in daily use by the wearer. For example, when it is desired to have the eye-glasses adjusted, to bring same closer to the eyes or further away from the eyes, in which case the average person has to engage the assistance of a skilled professional party to make such adjustment, such a party while making such adjustment usually bends and reshapes the ear-hook of the temple, distorting the original shape of such ear-hook. In many instances such reshaped ear-hook does not conform, nor does it readily adjust itself, to the curvature of the shape of the wearer's ear, oftentimes causing unnecessary painful irritation and annoyance to the wearer. But with temples constructed in accordance with applicant's invention, the wearer does not have to employ any skilled professional parties to adjust his eye-glass temples. The wearer can easily bring the ear-hook closer to the frame or move same further away from the frame, thereby adjusting his own glasses at will without any difficulty and without any expensive help.

Thus, an eye-glass set made in accordance with my invention may be readily used by the wearer to great advantage and be worn in great comfort, as it can be easily adjusted to various desired sizes in a manner to suit the individual wearer's requirements; it affords the possibility for the wearer to change her eye-glass temples to match her ear-rings or her attire, so that her eye-glass set will always have a fresh and pleasing appearance. It is believed that such eye-glass set will prove very practical and useful to the individual wearer and therefore of commercial value.

The variety of possible applications of my novel adjustable eye-glass set construction in connection with different types of eye-glass items, as hereinabove indicated, is so prolific that for the purpose of illustrating the invention, the specific embodiment of my invention in its application to eye-glass set structure exhibiting the greatest difficulties has been selected. Such eye-glass set is one which necessarily must conform most rigidly to the contours of the shape of the wearer's ears and nose and one which has the field of greatest possible commercial use. For this purpose I have selected for illustration of my novel construction an eye-glass set comprising a frame and temples wherein the adjustable features may be shown, so that the principle of construction may be best illustrated in an eye-glass set known as an adjustable eye-glass set.

The objects of the present invention are attained by a novel construction which will be hereinafter described and illustrated in the drawing in connection with a specific embodiment of the invention.

In the accompanying drawing in which such specific embodiment of my invention is illustrated, Fig. 1, is a view of my adjustable eye-glass set in the construction of which my invention has been embodied, partly in cross-section, and also showing the flexible hinge section permitting the temples to be fully swung-out sidewardly without flexing the frame.

Fig. 2 is an enlarged view showing the hingeable spring portion in a yieldable position, and also showing the movable means for adjusting the space between the temples with respect to each other.

Fig. 3 is an enlarged view of a portion of the adjustable temple structure.

Fig. 4 is a cross-sectional view taken along the line 4—4 of Fig. 3.

Fig. 5 is a cross-sectional view taken along the line 5—5 of Fig. 3.

Fig. 6 is an enlarged perspective view of the flexible hinge section.

Fig. 7 is an enlarged modified view of the end portion of the frame and of the flexible hinge section.

Fig. 8 is a modified view of the flexible hinge section.

Fig. 9 is a modified view of the temple structure, partly in cross-section, showing same as a right-hand temple.

Fig. 10 is a view showing the same temple as that of Fig. 9, adjusted in length, and as a left-hand temple.

Fig. 11 is an enlarged cross-sectional view showing the inner structure of a portion of the temple.

Fig. 12 is an enlarged cross-sectional view of a portion of the temple showing the slitted end structure.

Fig. 13 is an enlarged view of a similar portion as shown in Fig. 12, showing how the slitted end portion springs open when the shank-bar is inserted therein.

Fig. 14 is a modified view of the adjustable temple.

Fig. 15 is a modified view of the means for adjusting the temples with respect to the size of the space between such temples.

Fig. 16 is a cross-sectional view taken along the line 16—16 of Fig. 14.

Fig. 17 is a cross-sectional view taken along the line arrow 17 of Fig. 14.

Fig. 18 is a view showing the bridge portion of the frame being provided with removably mounted adjustable pad-carriers.

Fig. 19 is an enlarged view of one of the pad-carriers and pad the latter being in cross-section.

Fig. 20 is a view taken along the line 20—20 of Fig. 19 and

Fig. 21 is a view showing the flexible hinge section being secured to the outer face of the end portion of the frame, and also showing that the hinge section may be moved in either direction for the purpose of adjusting the size of the space between such temples, and showing adjustable means for limiting the flexibility of such hinge section to any desired degree.

Referring more particularly to the drawings, in which similar reference characters identify similar parts in the several views, in my novel adjustable eye-glass set.

Arrow A shows a frame structure provided with eyeglasses, or lenses, indicated by arrows C, and with temple sections E. The bridge portion B is provided with supporters B' built in the usual manner. But if desired, the bridge portion B may be provided with removably mounted pad-carriers B" secured thereto by any suitable means, but preferably in the following manner.

Each of these pad-carriers B" is provided with a slot B1, through this slot is positioned a screw-threaded element B2, this element B2 is then positioned, in a rotatable manner, into a screw-threaded opening located at the bridge portion B, so that by turning the element B2 in a certain direction the shoulder of this element B2 will rest upon the top-face B3 of the carrier B" and hold same tightly secured to the bridge portion B as shown at B4. By turning the screw element B2 in the opposite direction the hold upon the carrier B″ will be loosened and such carrier can then be adjusted into any desired horizontal or longitudinal position and be held in such position by again tightening the screw element B2. Of course, by removing the screw element B2 the carrier B″ may be removed and replaced by another carrier, for example, one of a different design, color, style or shape.

The lower portion of the pad-carrier B″ is formed in a manner providing an angularly-shaped pad-arm B5 which is provided with an enlarged portion B6 for a purpose which will be hereinafter explained.

The pad B7 is provided with an element B8 shaped in a manner providing an opening B9 and an underlying opening B10. The end portions B12 are, ordinarily, in an upwardly raised position, so as to permit the passage of the portion B6 into the opening B10, after such passage is completed these end portions B12 are then pressed downwardly into normal position in a manner forming a restricted opening as shown at B14, thereby securing the portion B6 in its position within the opening B10. It will be seen that while the portion B6 will hold the pad B7 in desired position, yet, the connection may be so arranged as to permit the pad B7 to move freely about its joint to an extent whereby it will rest freely upon the wearer's nose without causing irritation to such wearer, and yet not fall out of position. Of course, various changes in form of structure, shape or style with respect to the construction of the pad-carrier may be resorted to without departing from the spirit of this invention, for example, the frame portion B may be provided with slot B1 and the carrier B″ may be provided with the screw-threaded means to be positioned within the slot B1 and with locking means to hold same in desired position, the disclosures herein are for illustrative purposes only and not for limitation purposes.

The end portions D of the frame arrow A are each provided, at their inner faces, with a grooved-out section D′, and also with a slidable outer ring G. A flexible hinge section F is positioned within the groove D′. A screw-threaded element, pin or rivet G′ is then inserted through openings at the top and bottom walls of the ring G and through slots at the top and bottom walls of the groove section D′ (slots not shown) in a manner engaging the semi-circular bend or groove G″ of such member F thereby holding same in desired position as shown by F‴. Of course, the pin G′ may be held in its position by various suitable means, for example, solder, riveting, friction-fit or by means of screw-threads.

The flexible hinge section F is provided with a curved or tubular portion T′ formed in a manner, for example, as indicated by arrow T. This tubular portion is adapted to interfit with similar tubular portions of the hinge section E′ and be secured thereto by a pin or rivet F′. This hinge section E′ is secured to the temple E by means of pins, rivets or screw elements E″ thereby completing the hingeable connection between the frame arrow A and the temple E with the following results which will be hereinafter explained.

It is a known fact that while the present type eye-glass temples are being closed they may be folded inwardly, yet, when they are opened they can only be moved or swung open to a certain degree. Should such temples be opened further sidewardly, then a strenuous force will be created which will exert pressure upon the temples and frame, placing same under a great tension, causing same to flex, such flexing causes frequently breakage of the frames or of the temples, occasionally it causes the dislocation of the lenses from their position or the breakage of same, it also causes a pulling effect upon the hinges resulting in breakage of same. It can be readily seen that such a situation is quite undesirable to all concerned. It presents a difficult, annoying and costly problem which is highly objectionable to the user. It certainly presents a very vexing problem to the manufacturer and merchant, who must comply with the frequent complaints of their customers. Various attempts to solve this problem have thus far ended unsuccessfully.

But applicant's present invention solves this problem in a complete and satisfactory manner. The fact that applicant's flexible hinge section permits the temple to be swung-out sidewardly to a suitable degree relieves the frame and temples completely of the abovementioned strain or tension, thereby eliminating breakage of frame, temples or lenses. As a matter of fact, the temples in applicant's structure are not secured directly to the frame, they are secured to the slidable ring G, so that when these temples are being swung-out sidewardly the entire tension is carried by the flexible hinge section F, and the frame arrow A as well as the temples E are free of strain which may ordinarily cause breakage. Furthermore, the degree of flexibility of the hinge section F may be controlled if so desired. It will be seen that the flange portion J of the flexible hinge section F rests ordinarily against the wall K in a manner as shown at J″, but if desired, such flange portion J may be provided with a screw-threaded opening T″ wherein a screw element J′ may be inserted in a rotatable manner, so that by turning the screw element J′ in a certain direction the end portion of such element J′ will contact the inner face of the wall K and cause the flange J to move outwardly away from the wall K thereby tightening the tension and reducing the degree of flexibility of the hinge section F, whereas turning the screw element J′ in the opposite direction will cause the flange portion J to move inwardly towards the wall K thereby releasing the tension and increasing the degree of flexibility of the hinge section F.

It is a known fact that when glasses are fitted to the wearer, the temples are of such a size in length as to hold the glasses in a certain fixed position with respect to the wearer's eyes, but for desirable reasons persons occasionally place their glasses upon their foreheads, in which case the temples being unable to meet with the test cause the frames to flex, such flexing action causes occasional breakage of the frames or of the glasses, in addition thereto such flexing action press the bridge portion of the frame tightly into the flesh of the wearer's forehead causing painful irritation to the wearer. The above creates a very undesirable problem. But applicant's flexible hinge section solves this problem in a complete and satisfactory manner. It will be seen that while in ordinary use the temple E sits flush against the end portion D of the frame arrow A as shown by arrow C″, yet, when the frame is placed upon the forehead the hinge section F will yield and "give" to a suitable extent, for example, as shown by arrow A′ thereby minimizing breakage of the frame or of the lenses, and also eliminating painful irritation to the wearer.

It happens occasionally that after wearing the glasses for a while the wearer finds that the temples of his glasses are positioned too close to his face, and that he feels irritated by the constant touch of the temples against the skin of his face. In such a case, the usual remedy resorted to is the bending of the temples to conform with the curvature of his face. Such a remedy naturally results in the breakage of such temples, and even if the temples do not break, such bending operation usually puts such temples out of shape and they become useless for wearing purposes. Such bending operation does not therefore alter or change the situation, because the fault is not with the temples but with the frames. If the frame is too small for the wearer's face nothing can help except a new frame of a larger size. Thus the wearer has to undergo unexpected annoyance, inconvenience and expense. And the merchant is confronted with questions and complaints. A problem which is objectionable to all concerned.

But applicant's invention solves the above problem in a completely satisfactory manner. By moving or sliding the ring G in either direction the temples E will be brought either closer to the wearer's face or be moved further away from the wearer's face, for example, as indicated by the dotted lines D'', thereby eliminating all of the above-mentioned difficulties and expense. The ring G may be held in desired position by friction fit or by screw-threaded means (not shown). Furthermore, because of the adjustability of the frame into various desirable sizes, the merchant will be able to carry a smaller stock on hand thereby saving investment and space which can easily be utilized to increase his business opportunities.

If desired, the hinge section E' may be eliminated, and the temple E may be provided with the usual extension M' having an opening M'' adapted to cooperate with the tubular portion T', and be connected thereto by the pin F'.

In many eye-glass frames the end portions D are formed in a manner, for example, as shown in Fig. 7, wherein such end portions D are each provided with an opening P, in such a case the flexible hinge section F may be provided with two flange portions P' shaped to conform to the shape of the portion D, and be secured to the inner top face of such portion D by suitable means, for example, pins or rivets P''.

The flexible hinge section F may, if so desired be made in the form of a wire bend, in a manner for example as shown by arrow R (Fig. 8), wherein the opening R' is adapted to be connected to the hinge section E' by means of the pin F' and the opening R'' is adapted to be secured to the ring G by means of the pin G', in the same manner as is the hinge section F shown in Fig. 6.

If desired, the hinge section F may be made in the form as shown in Fig. 21, wherein such flexible hinge section F is provided with a slot F2. A screw-threaded element having a flat head portion F3 is inserted, through the slot F2, into a screw-threaded opening located in the portion D. A screw-threaded member having an oblong head portion F4 is positioned, through the same slot F2, into a screw-threaded opening located in the same portion D, but in a position nearer to the portion arrow T. The screw element and the screw member are so arranged in their position within the slot that the hinge section F may be moved in either direction for the purpose of adjusting the size of the space between the temples E. When the hinge section F is adjusted into suitable position the screw-threaded element is then turned in desired direction until the head portion F3 engages the upper surface F5 and hold tightly the hinge section F in such adjusted position.

It will be seen that the oblong head F4 fits loosely within the slot F2, so that such slot can pass the head F4 when the hinge F is in a full flexible position. If desired to limit or gauge the flexing space of the hinge F, then, the screw-threaded member may be moved outwardly and its head F4 may be placed in a position above the surface F5, in a manner as indicated by the dotted lines F6, thereby checking or limiting the flexing distance of the hinge section F. Of course, by adjusting the head F4 into different positions the flexing distance of the hinge section F may thus be adjusted into various suitable degrees. In addition thereto the screw-threaded member acts as a guide for the hinge section F when the latter is being moved to adjust the temples E into desired position. Of course, if desired, the oblong head F4 may be fully tightened against the hinge section F in which case it will hold same stationarily secured to the portion D in a manner eliminating flexing of such hinge portion F.

With respect to Fig. 15, it will be seen that, if desired, the portion D may be provided with a re-enforcing member or ring D1 adapted to receive slidably thereon a tubular element D2, a portion of the hinge D3 is secured to the tubular element D2 in any suitable manner, for example, solder, or riveting. The other portion of such hinge D3 is secured to the front portion L of the temple E in the same manner, so that by moving the tubular member D2 outwardly or inwardly as indicated by the dotted lines D5 the temples may thus be adjusted to provide the desired frame size for the individual wearer. It will be seen that when so adjusted the screw element D4 will hold the tubular element tightly secured in its position.

For explanatory purposes the following may be said; eye-glass temples are made in various lengths, the sizes usually range from about 5½ inches, running in quarter inch sizes, up to about 7 inches. The merchant must therefore keep on hand a large stock of sets having temples of various sizes in length in order to meet his business requirements, and also a large stock of temples of various sizes in length (temples are sold individually to replace broken temples) quite often, not having the right size of temple in stock, the merchant who is anxious to make a sale gives his customer the wrong size and tries to adjust such temple to the needed size by means of bending same, thereby getting such temple out of shape, thus resulting in misfit, breakage, and causing the wearer irritation and discomfort, and finally in buying new temples, which is quite annoying to the average person.

But applicant's invention solves this problem in a very satisfactory manner. A temple made in accordance with applicant's invention is adjustable in length to various desirable sizes, so that the merchant does not have to "bend" the temple out of shape in order to fit same to his customer's required size. And because of its adjustability the merchant is not compelled to hold a large stock on hand so that his capital and space so saved may be utilized for carrying other items which may be found suitable to increase the mechant's business.

From the above it will be seen, that applicant's adjustable temple structure E, comprising a front portion L provided with a longitudinal opening or bore L', wherein is positioned in a slideable manner an ear-hook L'', is a practical and useful structure.

It will be noted that the opening or bore L' is square-shaped cross-sectional, but the rear wall is of a narrower width than that of the front wall, and that the side walls N are somewhat angularly disposed, so that the ear hook L'' which is of similar shape cross-sectionally will thus slide easily within the opening L'. The centrally located rib or extension N' fits loosely within the space N'' and when the screw-threaded member O is turned in desired direction its bottom portion will press against the center wall of the space N'' of the ear-hook L'' in a manner forcing such ear-hook rearwardly within the opening L' to an extent whereby the rear wall and the angularly disposed side walls N of the ear-hook L'' will engage tightly the rear wall and the angularly disposed side walls of the bore L' thus securing the ear-hook in desired position within the front portion L. Of course, loosening the screw member O will permit slidable readjustment of the temple structure, and tightening such member O will naturally hold the portions of such readjusted temple structure together in a firm and secure manner.

With respect to Figs. 9, 10, 11, 12 and 13, the structure disclosed therein shows that, if desired, the ear-hook section 5 may be made of a size representing approximately the full length of the temple structure, in a manner, for example, as shown by arrow A (Fig. 10). This ear-hook-section 5 comprises a semi-circular-shaped portion 7, adapted to fit around the wearer's ear, and a rear portion 8. This rear portion 8 is provided with a longitudinal bore or aperture 16 having a restricted screw-threaded front-opening 18. This rear portion 8 may be made in any desirable manner, but, because of the small dimension cross-sectionally of the usually adapted temple size it is actually impossible to drill an opening several inches long within such a thin piece of wire. Nor is it possible to tap such a long opening, because taps of such small dimension cross-sectionally could not stand the strain of cutting threads in a bore several inches long. It is therefore preferable to make the rear portion 8 in the following manner; tubing of the proper size may be cut into the desired lengths, for example, as shown by the illustrations of the drawing (see Fig. 9) wherein one end portion of the rear portion 8 is swedged or formed into a sloping shape, of a smaller diameter cross-sectionally than that of the tubing itself, for example, as indicated by numeral 17, and then drilled from the front portion 19 (see Fig. 12) into the restricted opening thereby removing the inner edge portion and forming a straight and even tubular front opening. And then a reamer is placed into the opposite end of the opening 16 until it reaches a depth of approximately ⅞ of the opening, for example as indicated by numeral 18, thereby forming a straight and even tubular opening 16 provided with a restricted front opening 18 of a smaller cross-sectional dimension than that of the cross-sectional dimension of the opening 16. So that such opening 18, which in reality is about a quarter of an inch in length, will be the portion in which the tap will cut the threads without any danger of breakage. These threads will actually be an extension hanging down from the wall 16, so that while the threads Ba of the shank bar 6 will, during its movement within the opening 16, engage the threads 18, yet, it will move freely within the remaining portion of the tubular opening 16.

A certain amount of play is usually required between screw-threads when operating one within the other, thus screw-threads never engage each other in a completely full manner. In regular or large size threads such a manner is of little consequence, but in an item such as an eye-glass temple, wherein the threads are of such a small and fine gauge, it may well be that only the edge portions of the threads may engage each other, that of course is not sufficient for proper operation and lasting strength. To overcome this objectionable feature applicant provides the front portion of the tubular member 8 with a slit 25, such slitted portion is brought together or closed up throughout the full length of the screw-threaded extension 18, namely, from 19 to 26, so that when the screw-threaded section Ba is being inserted through the front opening 19 into the threaded tubular extension 18, the slitted screw-threaded extension 18 will flex open in a spring-like manner, for example, as shown at 32 and 29 (Fig. 13), thereby gripping the screw-threads Ba in a firm spring-like finger-grip manner, thus the threads of extension 18 and the threads Ba will engage each other almost to their fullest capacity. Naturally, while being operated within one another, the spring action provides sufficient amount of play necessary for operative purposes without losing the firm finger grip of the spring effect between the threads while being engaged with each other.

If desired, the member 8 may be made in a rolled manner, formed of sheet metal, for example, as shown by arrow Ka, wherein the member Ka is provided with the tubular opening 26 and with a restricted tubular opening 27 which is provided with screw-threads 31 and with the slit 29, all for the same purposes as hereinabove explained with respect to Figs. 11 and 12.

The tubular member 8 is provided at its rear end portion with an enlarged space or opening 12 which is adapted to receive the extension 11 of the ear-hook 5 in a manner whereby the shoulder walls 14 and 15 may meet in a tight frictional manner, thereby providing a continuous uninterrupted even outer surface of the temple arrow A, this connection may of course be formed in any other suitable manner.

As above state, the ear-hook section 5 may be made of a size representing approximately the full length of the temple structure, in which case the shank-bar 6 would be fully positioned within the longitudinal bore 16, that is, the screw-threads 18 would engage fully the screw-threads Da of the shank-bar 6 (naturally, the full temple length includes the shank-bar 6). But, if it is desired to lengthen the size of the temple, then, the shank-bar 6 may be moved outwardly of the bore 16, until the screw-threads 18 engages the threads Ca of the shank-bar 6, as shown in Fig. 9. And, if it is desired to further increase the length of such temple, then the shank-bar 6 may be further moved outwardly, until the screw-threads 18 engage the threads Ba, as shown in Fig. 10. Thus the temple may be adjusted to various desirable sizes in length. The spaced portions Ea and Fa separating the threaded sections Ba, Ca and Da act as gauges to indicate the length-size of the temple and also provides ornamental means for the temple structure. Naturally, the shank-bar 6 may be provided with more than three screw-threaded sections, or, if desired, it may be provided with one continuous thread instead of several separated screw-threaded portions. The shank-bar 6 is provided with the usual end portion 21 which is provided with an opening for hingeable connection with the frame section of the set. It will also be noted that turning the shank-bar 6 into a position as indicated by Ra will make the temple a right-hand temple, whereas turning the shank-bar 6 into the position as indicated by La will make the same temple a left-hand temple, thus applicant's temple structure may be utilized either as a right-hand temple or as a left-hand temple.

If desired, the portion 5 may be provided with a removably mounted decorative tubular cover 9, which may be removed and exchanged or replaced from time to time by other decorative covers as may be desired. This may be done in the following manner: the end portion 23 of the portion 7 may be provided with an external screw-thread adapted to receive thereon an internally screw-threaded cap 22, so that by removing the cap 22 the tubular element 9 may be removed, exchanged or replaced, and be held in position by the cap 22 when the latter is secured to its normal position upon the screw-threaded end portion 23.

It is a known fact that plastic material is usually affected by weather conditions and can therefore in many instances not be utilized in a precision manner. It is therefore believed that the structure illustrated in Figs. 14, 16 and 17 could be utilized to great advantage in connection with temples made of plastic. For example, the shank-bar 35 is provided with a metallic inlay 36, a pin or rivet 37 secures a metallic tubular member 38 to the shank-bar 35, this pin runs through the metallic insert 36. Of course, if desired, this insert 36 may be eliminated. The ear-hook 39 is provided at its end portion 40 with a metallic insert 41. A screw-threaded opening 42 is formed through such end portion and insert 41. A flat-headed screw-threaded element 43 is positioned within the opening 42. This end portion 40 including the screw element 43 is then inserted into the tubular member 38, and the screw element 43 is then being rotated by a suitable tool, for example, a screw-driver which is positioned through the slot 44 into the slot 45 of the head 43, so that upon being rotated in proper direction the element 43 will move outwardly and its flat head will press against the inner faces of the walls 46 and 47 thereby forcing the bottom wall 48 of the ear-hook 39 to press against the inner face 49 of the wall 51 thereby tightening the hold of the screw element 43 and the end portion 40 within the tubular member 38, thus uniting the ear-hook 39 and the shank-bar 35 into a unitary temple structure. It may be noted that the slot 45 is of semi-circular shape and does not extend fully across the flat head 43, so that the end portion of such head will not get caught within the slot 44. It will also be noted that the end portion 40 is provided with a recessed section 52 forming a seat for the head 43 thus the ear-hook 39 may be cross-sectionally of approximately the same size as the inner space of the tubular member 38 and slide therein in an uncramped manner.

It will thus be seen that applicant's invention, namely, an adjustable eye-glass set, constructed in a manner, wherein the frame portion can be adjusted to fit various types of faces, and wherein the temples may be adjusted in length to various desirable sizes, and wherein the pad-carriers may be adjusted to any desirable position horizontally and longitudinally, and wherein the end portions of the frame are provided with hinges of a flexible nature permitting the temples to be swung open to various degrees, and wherein such hinges provide yieldable means at suitable occasions, and wherein said adjustable temples are exchangeable or replaceable without the aid of professional help; such eye-glass set is thus believed to be practical from every point of view. It solves various difficult problems in connection with eye glasses, it is economical to all concerned, and is therefore believed to be beneficial to the wearer thus of great commercial value.

From the above it will be seen that I have invented and perfected an adjustable eye-glass set of a new and unique structure and design, an eye-glass set which is practical, useful and therefore of commercial value, and although I have shown certain preferred forms or illustrations in order to explain and describe the novelty of my invention, yet, by showing such structure, I do not, by any means, limit myself to these structures, nor to the terms used in describing same, as they are for illustrative purposes only. Various suggestions and changes of structure may be resorted to, and I desire it to be understood that I have same in mind when showing and describing this invention, and seek protection by Letters Patent. And, although I have mentioned in describing this invention of what material certain parts may be made, how they may be formed, shaped or styled and how they may be assembled, yet, I desire it to be understood that this structure, or parts thereof, may be made of any suitable material, and shaped, formed, styled or arranged in any desirable manner, and assembled in any convenient way so that the parts may be easily taken apart, removed, cleaned, replaced and assembled, and that various changes in detail may be resorted to without departing from the spirit of this invention.

I claim:

1. An adjustable eye-glass set comprising a frame structure having adjustable temple sections, said frame structure comprising a bridge and nose-rest portion and side end portions, said nose-rest portion provided with screw-threaded openings, pad carriers for said nose-rest portions, each of said carriers having a slot, screw-threaded elements each having an enlarged head section, one of said elements positioned through one of said slots and engaging one of said openings for attaching such carrier to said nose-rest portion, said element rotatable in either direction to permit the simultaneous horizontal and longitudinal adjustment of said carrier for properly positioning said structure upon the wearer's nose, said head section adapted to hold said carrier secured in desired adjusted position, each of said side end portions provided with a groove, a ring carried by each of said end portions, hinge sections, each of said hinge sections having a flexible flange portion positioned within the said groove and held in position by a pin carried by said ring and adapted to be slidably adjusted to adjust the length of the frame, each of said hinge sections having a flexible free end portion, said temple sections secured pivotally to said free end portions, said flexible free end portions being yieldable to a degree permitting the said temple sections to be swung outwardly approximately in a line parallel to said frame portion lifting said flexible free end portions from their normal position, each of said temple sections comprising an ear-hook and shank-bar adjustable lengthwise with relation to each other for properly holding said frame structure in desired position upon the wearer's nose.

2. An adjustable eye-glass set comprising a frame portion and two temple sections, said frame having side end portions, each of said end portions having a grooved section and a ring movable thereover, two hinge sections each comprising a flexible member, one of said temple sections secured to one end portion of one of said flexible members and the other of said temple sections secured to one end portion of the other of said flexible members, the free end portion of one of said flexible members positioned within one of said grooved sections and held in position by its movable ring and the free end portion of the other of said flexible members positioned within the other of said grooved sections and held in position by the other of said movable rings, said movable rings adapted to carry the said temple sections in either direction longitudinally of the said frame for adjusting the spacing of such temple sections with respect to each other to suit the wearer's face, means for holding said rings in adjusted position, each of said temple sections adapted to be swung outwardly approximately in a line parallel to the said frame and to be moved back into desired position without danger of breakage.

References Cited in the file of this patent

UNITED STATES PATENTS

| Number | Name | Date |
|---|---|---|
| 610,817 | May | Sept. 13, 1898 |
| 638,727 | Lauch | Dec. 12, 1899 |
| 706,389 | Christensen | Aug. 5, 1902 |
| 1,200,862 | May | Oct. 10, 1916 |
| 1,245,884 | Day | Nov. 6, 1917 |
| 1,310,203 | Meyrowitz | July 15, 1919 |
| 1,631,559 | Stevenson | June 7, 1927 |
| 1,841,052 | Pollmiller | Jan. 12, 1932 |
| 1,919,731 | Kates | July 25, 1933 |
| 1,942,298 | Le Doux | Jan. 2, 1934 |
| 1,964,828 | Pappert | July 3, 1934 |
| 1,965,277 | Blase | July 3, 1934 |
| 2,034,326 | Brown | Mar. 17, 1936 |
| 2,043,843 | Styll et al. | June 9, 1936 |
| 2,057,288 | Bailey | Oct. 13, 1936 |
| 2,058,969 | Fishman | Oct. 27, 1936 |
| 2,112,644 | Bausch | Mar. 29, 1938 |
| 2,148,397 | Bock | Feb. 21, 1939 |
| 2,197,020 | Page | Apr. 16, 1940 |
| 2,389,428 | Glasser | Nov. 20, 1945 |
| 2,445,153 | Rearick | July 13, 1948 |
| 2,486,881 | Roth | Nov. 1, 1949 |
| 2,578,318 | Ronicker | Dec. 11, 1951 |

FOREIGN PATENTS

| 427,831 | Great Britain | May 1, 1935 |